US009591805B2

(12) United States Patent
Driessen

(10) Patent No.: US 9,591,805 B2
(45) Date of Patent: Mar. 14, 2017

(54) DEVICE FOR HARVESTING FRUIT HANGING FROM A PLANT AS WELL AS A METHOD FOR HARVESTING FRUIT HANGING FROM A PLANT

(71) Applicant: DRIESSEN BLUEBERRIES B.V., Melderslo (NL)

(72) Inventor: Leon Johannes Gerardus Driessen, Melderslo (NL)

(73) Assignee: Driessen Blueberries B.V., Melderslo (NL)

( * ) Notice: Subject to any disclaimer, the term of this patent is extended or adjusted under 35 U.S.C. 154(b) by 0 days.

(21) Appl. No.: 14/415,049

(22) PCT Filed: Jul. 2, 2013

(86) PCT No.: PCT/EP2013/063945
§ 371 (c)(1),
(2) Date: Jan. 15, 2015

(87) PCT Pub. No.: WO2014/012788
PCT Pub. Date: Jan. 23, 2014

(65) Prior Publication Data
US 2015/0181807 A1    Jul. 2, 2015

(30) Foreign Application Priority Data

Jul. 19, 2012    (NL) ..................................... 2009207

(51) Int. Cl.
*A01D 46/00*    (2006.01)
*A01D 46/26*    (2006.01)
*A01D 46/28*    (2006.01)

(52) U.S. Cl.
CPC ........... *A01D 46/264* (2013.01); *A01D 46/28* (2013.01); *A01D 2046/262* (2013.01); *A01D 2046/266* (2013.01)

(58) Field of Classification Search
CPC ...... A01D 46/28; A01D 46/264; A01D 46/00; A01D 2046/262; A01D 46/20; A01D 46/24; A01D 46/26; A01D 46/285
(Continued)

(56) References Cited

U.S. PATENT DOCUMENTS 3,006,131 A     10/1961  McDowell
3,184,908 A *    5/1965  Rust ....................... A01D 46/28
                                                56/330

(Continued)

FOREIGN PATENT DOCUMENTS

EP          1369022       12/2003

OTHER PUBLICATIONS

International Preliminary Report on Patentability and Written Opinion of the International Searching Authority, International Application No. PCT/EP2013/063945, Jan. 20, 2015, 4 pages.
(Continued)

*Primary Examiner* — Árpád Fábián-Kovács
(74) *Attorney, Agent, or Firm* — Barnes & Thornburg LLP

(57) ABSTRACT

A device which is suitable for harvesting fruit hanging from a plant at least having a mobile frame, which frame at least comprises two opposite, longitudinal sides for guiding fruit. The frame further comprises fruit collecting devices adjoining the first longitudinal side. At least one longitudinal side is provided with wirelike, flexible elements extending from the first longitudinal side, over which elements the fruit can be guided.

14 Claims, 5 Drawing Sheets

(58) Field of Classification Search
USPC .......................... 56/330, 328.1, 329, 340.1
See application file for complete search history.

(56) References Cited

U.S. PATENT DOCUMENTS

| | | | | |
|---|---|---|---|---|
| 3,360,913 A * | 1/1968 | Burton | ............... | A01D 46/28 56/330 |
| 3,521,438 A * | 7/1970 | Adrian | ............... | A01D 46/00 56/330 |
| 3,538,694 A * | 11/1970 | Holloway | ............ | A01D 46/28 56/330 |
| 3,613,339 A * | 10/1971 | Riggs | ............... | A01D 45/00 56/130 |
| 3,685,266 A * | 8/1972 | Mohn | ............... | A01D 46/28 56/330 |
| 3,690,054 A * | 9/1972 | De Carlo | ............ | A01D 46/28 56/330 |
| 3,815,343 A * | 6/1974 | Sell | ............... | A01D 46/28 56/1 |
| 3,827,222 A | 8/1974 | Toti | | |
| 3,866,401 A * | 2/1975 | Claxton | ............ | A01D 46/28 56/330 |
| 4,083,773 A * | 4/1978 | Clary | ............... | A01D 46/285 209/134 |
| 4,134,251 A * | 1/1979 | Burton | ............... | A01D 46/28 56/330 |
| 4,172,352 A * | 10/1979 | McCarthy | ............ | A01D 46/28 56/330 |
| 4,259,833 A * | 4/1981 | Mohn | ............... | A01D 46/28 56/329 |
| 4,383,400 A * | 5/1983 | Mead | ............... | A01G 17/00 56/12.7 |
| 4,750,322 A | 6/1988 | Korthuis | | |
| 4,802,812 A * | 2/1989 | Simpson, III | ........ | A01D 46/20 414/508 |
| 4,974,404 A * | 12/1990 | Korthuis | ............ | A01D 46/28 56/328.1 |
| 5,092,113 A * | 3/1992 | Turunen | ............ | A01D 46/28 193/7 |
| 5,109,657 A * | 5/1992 | DeVries | ............ | A01D 46/28 56/330 |
| 5,181,373 A * | 1/1993 | Littau | ............... | A01D 46/28 56/329 |
| 5,287,687 A * | 2/1994 | Urich | ............... | A01D 46/00 56/327.1 |
| 5,339,612 A * | 8/1994 | Scott | ............... | A01D 46/28 56/328.1 |
| 5,341,630 A * | 8/1994 | Littau | ............... | A01D 46/28 56/330 |
| 5,495,708 A * | 3/1996 | Scott | ............... | A01D 46/28 56/329 |
| 5,642,610 A * | 7/1997 | Dupon | ............... | A01D 46/28 56/330 |
| 5,647,194 A * | 7/1997 | Scott | ............... | A01D 46/28 56/328.1 |
| 5,956,933 A * | 9/1999 | Heard | ............... | A01D 46/28 56/327.1 |
| 6,058,690 A * | 5/2000 | Rutt | ............... | A01D 57/10 56/327.1 |
| 6,463,725 B1 * | 10/2002 | Briesemeister | ...... | A01D 46/264 56/328.1 |
| 6,484,487 B1 * | 11/2002 | Buist | ............... | A01D 46/264 56/330 |
| 6,557,335 B2 * | 5/2003 | Amaro | ............... | A01D 46/00 56/328.1 |
| 6,865,872 B2 * | 3/2005 | Youman | ............ | A01D 46/28 56/328.1 |
| 6,901,731 B2 * | 6/2005 | Scott | ............... | A01D 46/264 56/330 |
| 7,703,269 B2 * | 4/2010 | McKibben | ............ | A01D 46/28 56/329 |
| 7,748,205 B2 * | 7/2010 | Amaro | ............... | A01D 46/24 56/328.1 |
| 7,818,953 B2 * | 10/2010 | Pellenc | ............... | A01D 46/28 56/10.2 R |
| 8,117,814 B2 * | 2/2012 | Sidhu | ............... | A01D 46/28 56/329 |
| 8,635,845 B1 * | 1/2014 | Palm | ............... | A01D 46/28 56/328.1 |
| 2005/0034441 A1 * | 2/2005 | Porta | ............... | A01D 46/264 56/328.1 |
| 2005/0252190 A1 * | 11/2005 | Scott | ............... | A01D 46/264 56/340.1 |
| 2007/0012018 A1 * | 1/2007 | Pellenc | ............... | A01D 46/28 56/328.1 |

OTHER PUBLICATIONS

International Search Report and Written Opinion, Application No. PCT/EP2013/063945, dated Aug. 14, 2013.

* cited by examiner

DEVICE FOR HARVESTING FRUIT HANGING FROM A PLANT AS WELL AS A METHOD FOR HARVESTING FRUIT HANGING FROM A PLANT

CROSS REFERENCE TO RELATED APPLICATIONS

This application is a U.S. nationalization under 35 U.S.C. §371 of International Application No. PCT/EP2013/063945, filed Jul. 2, 2013, which claims priority to Netherlands Application No. 2009207, filed Jul. 19, 2012.

The invention relates to a device suitable for harvesting fruit hanging from a plant, which device at least comprises a mobile frame, which frame at least comprises two opposite, elongated fruit guiding means, wherein first longitudinal sides of the fruit guiding means are positioned lower than opposite second longitudinal sides of the fruit guiding means, which frame further comprises fruit collecting devices adjoining the first longitudinal sides of the fruit guiding means.

The invention further relates to a method for harvesting fruit hanging from a plant, using such a device.

The word "plant" as used herein is understood to mean any crop with fruit hanging therefrom, such as fruit trees or bushes, for example, which usually have a woody stem. The fruit may be berries, such as blueberries, redcurrants, blackcurrants or blackberries, raspberries or different fruit types.

In such a device, which is known from U.S. Pat. No. 4,750,322, each fruit guiding means comprises a number of pivotable collecting plates, the plates of which opposite fruit guiding means partially overlap. When the frame is moved from one plant to the other plant, the collecting plates come into contact with the stem of the fruit tree, with the collecting plates pivoting against spring force and being positioned around the stem of the fruit tree. Fruit that is dislodged from the fruit three by means of a relatively complex mechanism forming part of the device falls on the collecting plates, which are disposed at an angle, and slides from the collecting plates to fruit collecting devices located at the outer sides of the collecting plates. The fruit collecting devices comprise conveyor belts for further transport of the fruit.

The device known from U.S. Pat. No. 4,750,322 is relatively complex and primarily suitable for fully mechanical harvesting of large amounts of fruit.

Such a device is furthermore in particular suitable for use with older fruit trees whose stem already has a certain thickness, so that the stem can easily withstand the forces exerted thereon. Such collecting plates are not suitable for young fruit trees.

A further drawback of the collecting plates is the fact that two collecting plates disposed side by side may indeed abut against the stem, but that a clearance still remains between the collecting plates themselves and/or along the edges of the collecting plates, through which fruit, especially relatively small fruit such as blueberries, for example, can fall. Said fruit will either have to be picked up manually, which is time-consuming and thus costly, or it will remain behind on the ground and will not be harvested.

The object of the invention is to provide a device suitable for harvesting fruit hanging from a plant, wherein fruit falling from a plant is collected in a reliable manner, wherein forces exerted on the plant by the device are small.

With the device according to the invention this object is achieved in that at least one fruit guiding means is provided with wirelike, flexible elements extending from the first longitudinal side, over which elements the fruit can be guided.

Since the wirelike, flexible elements are relatively pliable, the forces that occur when the wirelike, flexible elements are pressed against the stem of the plant will be relatively small. The wirelike, flexible elements properly abut against and around the stem, so that no clearance through which fruit can fall will remain. The wirelike, flexible elements extend from the lower, first longitudinal side to the higher, second longitudinal side, so that fruit being dislodged will slide from the higher, second longitudinal side to the lower, first longitudinal side and the adjoining fruit collecting device under the influence of gravity.

Another advantage is the fact that the wirelike, flexible elements are relatively inexpensive and can readily be produced in any desired length and thickness. Also the density of the number of wirelike, flexible elements can be easily adapted as desired. Furthermore, the wirelike, flexible elements can be provided in any desired number on the first longitudinal side of the fruit guiding means.

Furthermore, the forces exerted on the fruit falling on the wirelike, flexible elements will be reduced because the wirelike, flexible elements can slightly bend along with the falling fruit.

One embodiment of the device according to the invention is characterised in that both fruit guiding means are provided with wirelike, flexible elements extending from the first longitudinal side, wherein ends of the wirelike, flexible elements remote from the first longitudinal sides of the two fruit guiding means can be positioned into abutment with each other.

The fruit guiding means are positioned on either side of the stem of the plant, with wirelike, flexible elements abutting against the stem from either side. The ends of the wirelike, flexible elements of the opposite fruit guiding means butt against each other or extend between each other, so that the space around the stem is properly closed and a proper abutment of the opposite fruit guiding means is obtained.

Another embodiment of the device according to the invention is characterised in that the wirelike, flexible elements have a length in the order of 150 to 300 millimeter, preferably about 200 millimeter.

When such lengths are used, it is possible to position the wirelike, flexible elements around and against the stem from either side, whilst the forces being exerted on the stem will remain limited. Also the distance to the fruit collecting device will remain limited in that case, so that the device will not have an unnecessarily great width.

Another embodiment of the device according to the invention is characterised in that the wirelike, flexible elements have a diameter in the order of 0.3 to 2 millimeter, preferably about 0.8 millimeter.

Such diameters make it possible on the one hand to make the wirelike elements sufficiently flexible, so that they can bend around the stem and position themselves between each other, and on the other hand to make them sufficiently strong to carry the weight of the falling fruit and to be able to extend at the desired angle between the lower, first longitudinal side and the higher, second longitudinal side.

Another embodiment of the device according to the invention is characterised in that the wirelike, flexible elements include an angle in the order of 30 to 60 degrees, preferably about 45 degrees, with the horizontal.

When such an angle is used, the fruit will easily slide to the fruit collecting device.

Another embodiment of the device according to the invention is characterised in that the wirelike, flexible elements are made of plastic material.

Plastic is a suitable material for being used in treating fruit, because it is easy to clean properly. Moreover, any desired dimension of the wirelike, flexible elements can be realised when using plastic.

Another embodiment of the device according to the invention is characterised in that the wirelike, flexible elements are arranged in a number of layers lying on top of each other.

The wirelike, flexible elements can thus be relatively thin, so that they are easy to bend, whilst sufficient load bearing capacity for collecting the falling fruit and an adequate enclosure of the stem can nevertheless be ensured on account of the number of layers.

Another embodiment of the device according to the invention is characterised in that the number of layers of wirelike, flexible elements lying on top of each other ranges between 5 and 20, preferably said number is about 10 to 12.

When such a number of layers is used, a sufficient density of wirelike, flexible elements is obtained.

Another embodiment of the device according to the invention is characterised in that the fruit guiding means, each with its adjoining fruit collecting device, can be moved away from and toward each other in a direction transversely to the longitudinal sides.

During movement of the device from one plant to the other plant, the fruit guiding means, each with its adjoining fruit collecting device, are in a position away from each other. Not until the fruit guiding means are positioned opposite the stem of the next plant are the fruit guiding means, each with its adjoining fruit collecting device, moved toward each other, causing the wirelike, flexible elements to abut against the stem. As a result, the forces exerted on the stem are reduced more than in the case where the device is moved toward the plant with wirelike, flexible elements of the two fruit collecting devices abutting against each other and the wirelike, flexible elements are moved along the stem during movement of the device.

In this embodiment the wirelike, flexible elements preferably extend transversely to the first longitudinal side, so that the wirelike, flexible elements will not exhibit a preferred direction of bending upon movement toward the stem.

If the device would be moved toward the plant with wirelike, flexible elements of the two fruit collecting devices abutting against each other, the wirelike, flexible elements will preferably extend partially opposite the direction of movement so as to allow the wirelike, flexible elements to slide more easily along the stem. Also in that case, however, the stem will be subjected to unnecessary forces.

Another embodiment of the device according to the invention is characterised in that the frame is provided with guides for the fruit collecting device on either side of each fruit collecting device, which guides extend transversely to the longitudinal sides, each guide having a first, raised part, a second, lowered part and a third part which slopes down between the first part and the second part.

The first, raised part is preferably positioned so that in the position away from each other of the fruit collecting devices, the fruit collecting device is located near the first raised part, so that a user can easily remove the fruit collected there. The second, lowered part will then be positioned so that once the fruit collecting devices have been moved together, the fruit collecting device will be located relatively low at the stem, so that the fruit collecting device can also be moved under low-hanging branches.

Another embodiment of the device according to the invention is characterised in that the frame is movable at least in a direction of movement extending parallel to the longitudinal sides of the fruit guiding means.

The fruit guiding means can be easily positioned on either side of the stem during transport in the direction of movement.

Another embodiment of the device according to the invention is characterised in that the fruit collecting device at least comprises a surface that slopes down from the first longitudinal side, a fruit outlet opening located on a side of the downwardly sloping surface remote from the first longitudinal side, and a removable container that can be positioned under the fruit outlet opening.

In this way the fruit is put into a container in a simple manner. When the container is full, it can be easily exchanged for an empty container. The full containers can be stored or be transported to buyers.

Another embodiment of the device according to the invention is characterised in that the fruit outlet opening of the fruit collecting device is rectangular in shape, the fruit outlet opening being bounded on a first side by the surface that slopes down from the first longitudinal side and, on at least one second side, by an auxiliary surface that slopes up from the fruit outlet opening.

The sloping surface and the auxiliary surfaces, together with the wirelike, flexible elements provide a large collecting area around the stem of the plant, so that all the falling fruit can be collected in a reliable manner.

Another embodiment of the device according to the invention is characterised in that the fruit collecting device is provided with a container inlet opening on a side remote from the first side.

A removable container can be easily positioned under the fruit outlet opening via such a container inlet opening. Since the container inlet opening is located on a side remote from the first side, the container inlet opening is readily accessible.

Another embodiment of the device according to the invention is characterised in that the frame is provided with container supports located on either side of the fruit guiding means.

The computer supports are capable of supporting empty and full containers, so that a user of the device will have a number of empty containers at hand and need not take away full containers until all the empty containers are full.

Another embodiment of the device according to the invention is characterised in that the device is provided with a manually operable plant shaking device.

Using such a plant shaking device, which is known from EP 1 369 022 A1, for example, a branch can be shaken so that the fruit will be dislodged from the branch. Usually, the force with which said shaking takes place can be set so that only ripe fruit will be dislodged and fruit which is not ripe yet and which is still more firmly connected to the branch will not be dislodged. Such a plant shaking device obviates the need for the user to shake the branches himself.

With the method according to the invention the object of the present invention is achieved in that the frame is moved toward the plant for harvesting, until the fruit guiding means are positioned on either side of the plant, wherein at least one fruit guiding means is provided with wirelike, flexible elements extending from the first longitudinal side, which elements abut against a stem of the plant, whereupon the plant is being shaken until the fruit is dislodged, which fruit will slide over the wirelike, flexible elements to the fruit collecting device.

Using this method, fruit is collected in a simple manner, the forces exerted on the stem are relatively small and an adequate enclosure around the stem is ensured.

One embodiment of the method according to the invention is characterised in that the fruit guiding means, each with the adjoining fruit collecting device, are moved away from each other before the device is moved to a plant, whilst the fruit guiding means, each with the adjoining fruit collecting device, are moved toward each other after the device has been moved to a plant, wherein the wirelike, flexible elements are pressed against the stem of the plant and around the stem of the plant from either side of the plant under elastic deformation of the wirelike, flexible elements.

Positioning the fruit guiding means, each with the adjoining fruit collecting device, into abutment with each other and with the stem only at the moment when the fruit guiding means are located on either side of the stem achieves that the stem is prevented from being subjected to unnecessary forces. Moreover, the forces required for moving the device are thus also smaller than in the case in which the wirelike, flexible elements must be moved along the stem.

Another embodiment of the method according to the invention is characterised in that the fruit is dislodged from the plant by means of a manually operable plant shaking device.

The use of such a plant shaking device obviates the need for the user to shake the branches himself.

The invention will now be explained in more detail with reference to the drawing, in which.

Like parts are indicated by the same numerals in the figures.

Figure 1:
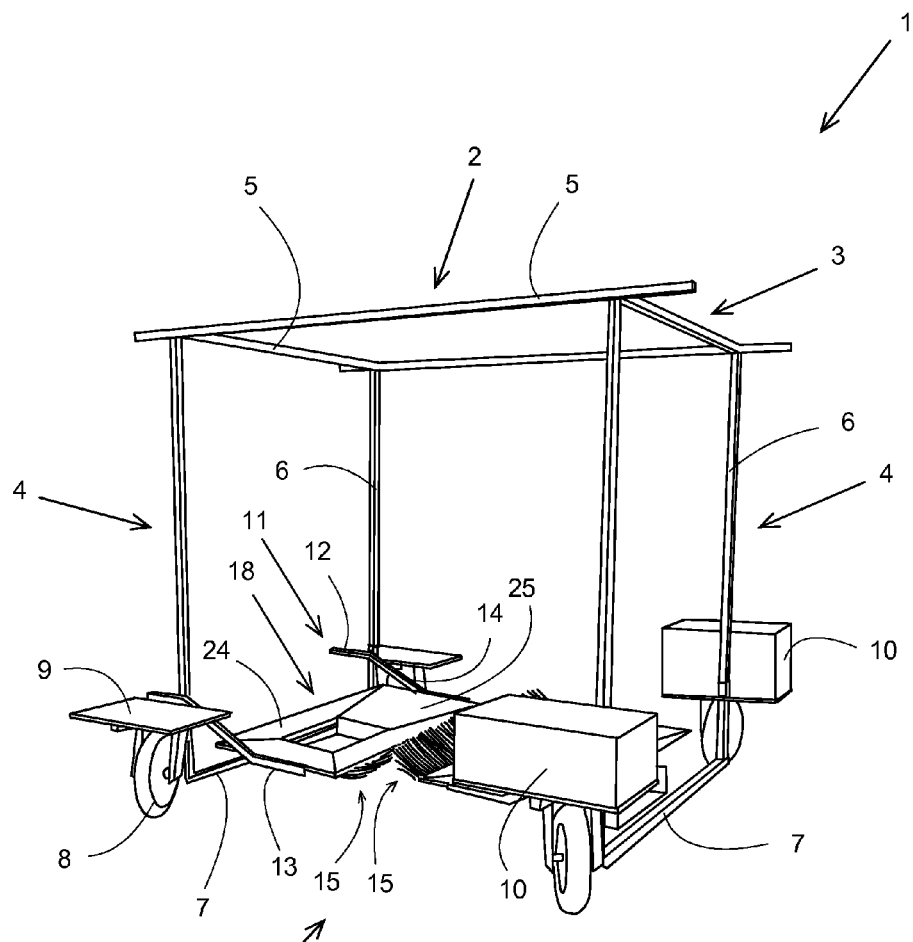
FIG. 1 is a perspective view of the device according to the invention.
Figure 1:
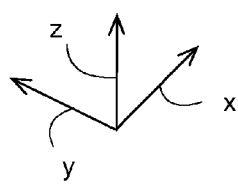

FIGS. 1-4 show various views of a device 1 according to the invention, which device 1 is suitable for harvesting fruit hanging from plants such as fruit trees. The device 1 is provided with a mobile U-shaped frame 2 comprising a bridge part 3 and two leg parts 4 extending downward from the bridge part 3. The bridge part 3 comprises four metal girders 5 interconnected in a rectangular configuration. The leg parts 4 each comprise two uprights 6, which are interconnected by a girder 7 on the side remote from the bridge part 2. Each upright 6 is provided with a wheel 8 and a container support 9 for a container 10, which is located above the wheel 8. The container 10 has a height of 0.12 meter, a width of 0.4 meter and a length of 0.6 meter, for example. Because of the presence of the wheels 8, some of which can swivel, the device 1 is movable at least in a direction of movement x indicated by the arrow P1. The frame 2 has a width of 2 meter, a length of 1.6 meter and a height of 2.2 meter, for example.

A guide 11 is furthermore connected to each upright 6, which guide has a first raised part 12 near the upright 6, a second lower part 13 spaced from the upright 6 and a third part 14 that extends downward between the first part 12 and the second part 13. The guides 6 extend in the y,z-plane.

The device 1 is further provided with two opposite, elongated fruit guiding means 15, wherein first longitudinal sides 16 of the fruit guiding means 15, which extend in the x-direction, are located lower than opposite second longitudinal sides 17 of the fruit guiding means 15. The device is further provided with fruit collecting devices 18 that adjoin the first longitudinal sides 16 of the fruit guiding means 15.

Each fruit guiding means 15 is provided with wirelike, flexible elements 19 extending from the first longitudinal side 16, which wirelike, flexible elements 19 extend transversely to the first longitudinal side 16. The wirelike, flexible elements 19 are made of plastic material; they have a length of about 200 millimeter, a diameter of about 0.8 millimeter, extending at an angle A of about 45 degrees to the horizontal 20. The wirelike, flexible elements 19 extend over a distance of, for example, 1.5 meter of the longitudinal sides 16.

The wirelike, flexible elements 19 are arranged in a number of layers lying on top of each other. The number of layers amounts to about 10 or 12. The aggregate of all wirelike, flexible elements 19 of a fruit guiding means 15 can be formed into a kind of brush. The angle A may be adjustable, if desired.

Figure 2:
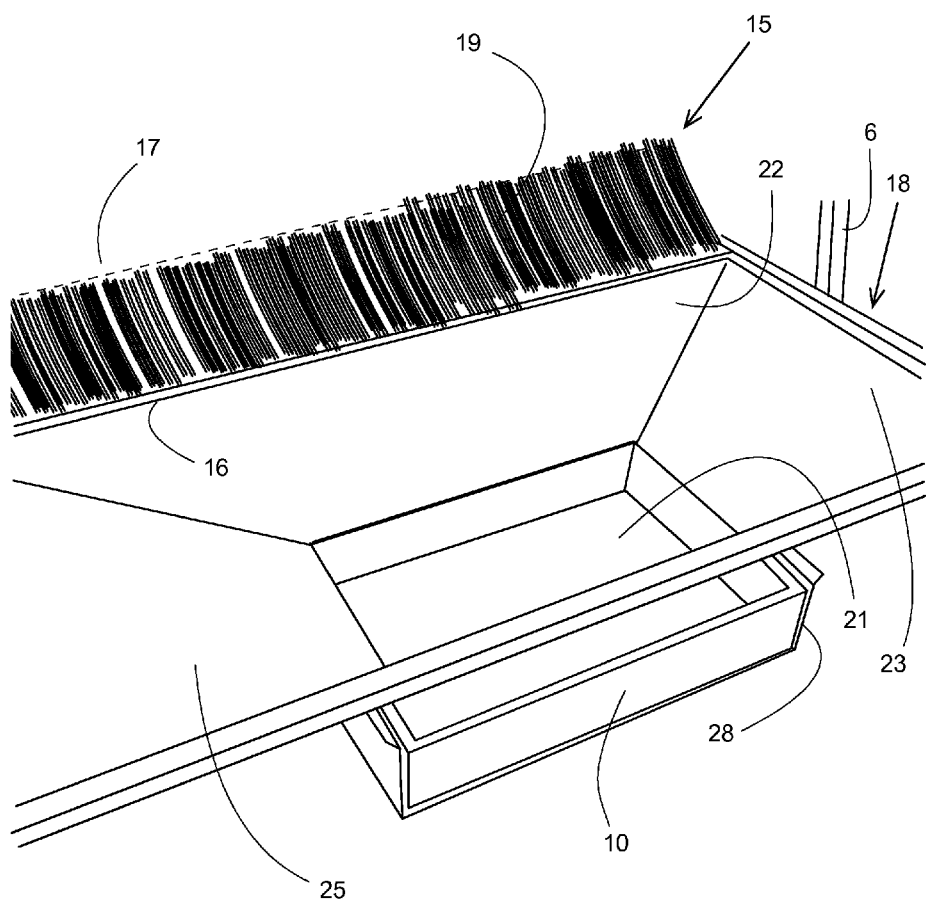
FIG. 2 is an enlarged perspective view of a part of the device shown in FIG. 1, which is provided with a fruit guiding means and an adjoining fruit collecting device.
Figure 3:
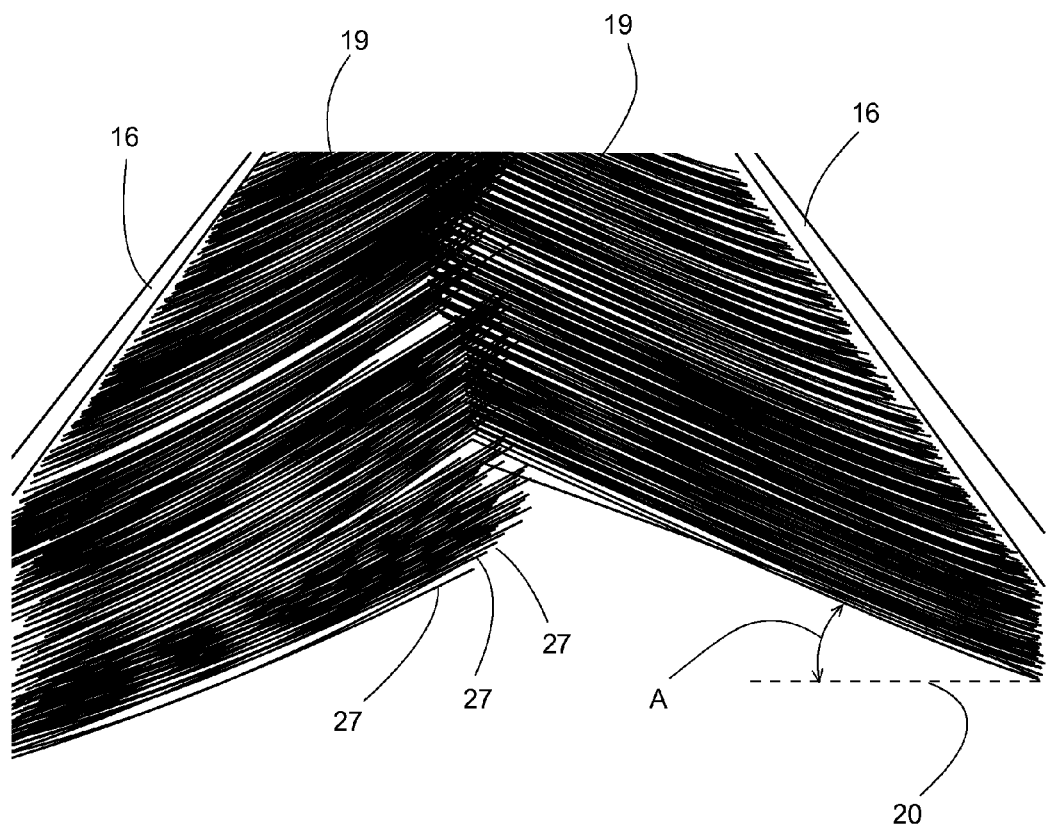
FIG. 3 is another enlarged perspective view of a part of the device shown in FIG. 1, which is provided with two opposite, abutting fruit guiding means.
Figure 4:
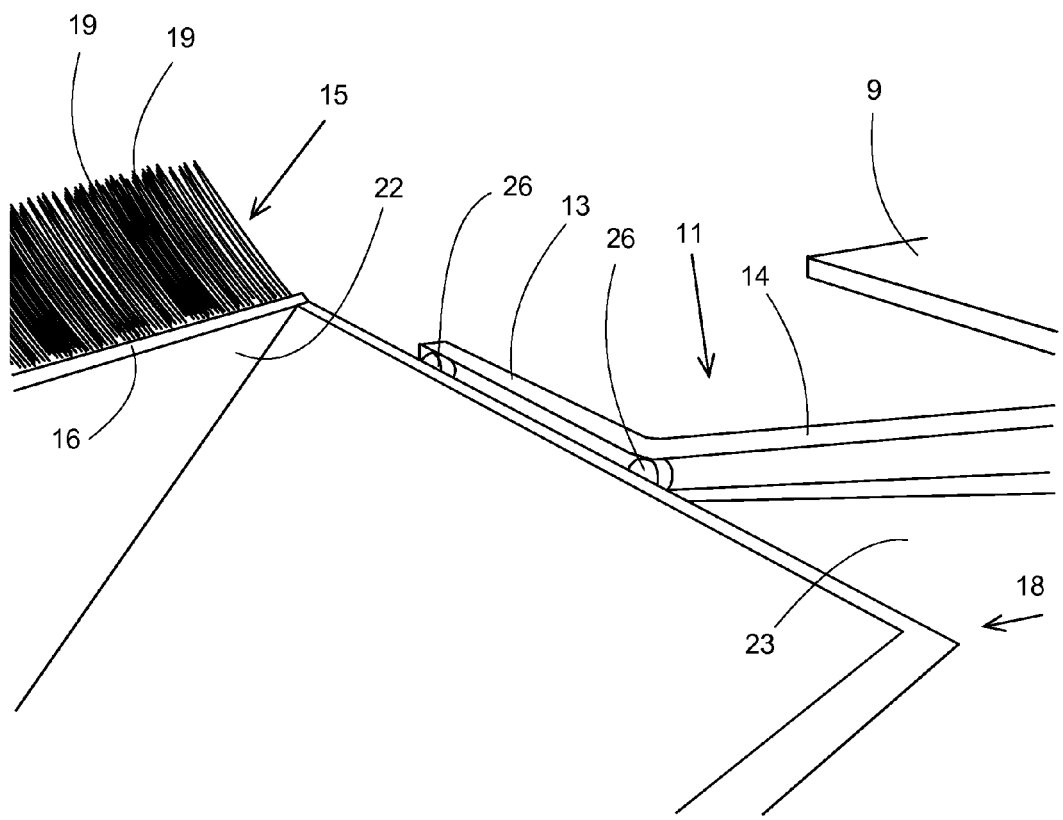
FIG. 4 is another an large perspective view of a part of the device shown in FIG. 1, which is provided with guides of the fruit collecting device which are located in a lower part of the fruit collecting device.

The fruit collecting device 18 is provided with a rectangular fruit outlet opening 21, which is bounded on a first side by a surface 22 that slopes down from the first longitudinal side 16 and, on the other three sides, by auxiliary surfaces 23, 24, 25 that slope up from the fruit outlet opening 21. Located under the auxiliary surface 24 is a container inlet 28 for containers 10. As shown in FIG. 2, a container 10 can be moved into the container inlet opening 28, so that the container 10 will be positioned under the fruit outlet opening 21. Part of the container 10 extends beyond the auxiliary surface 24, so that said part can be taken hold of for moving the container 10 out of the container inlet opening 21 in a simple manner again.

The dimension of the collecting area of the fruit collecting device 18 is 0.7 meter in y-direction and 1.5 meter in x-direction, for example. The fruit collecting device 18 is provided with two guide wheels 26 on either side, which guide wheels 26 are supported in the guide 11. As a result, the fruit collecting device 18 can be moved jointly with the fruit guiding means 15 connected thereto in a direction transversely to the longitudinal sides 16, 17 toward and away from the opposite fruit guiding means 15.

Figure 5:
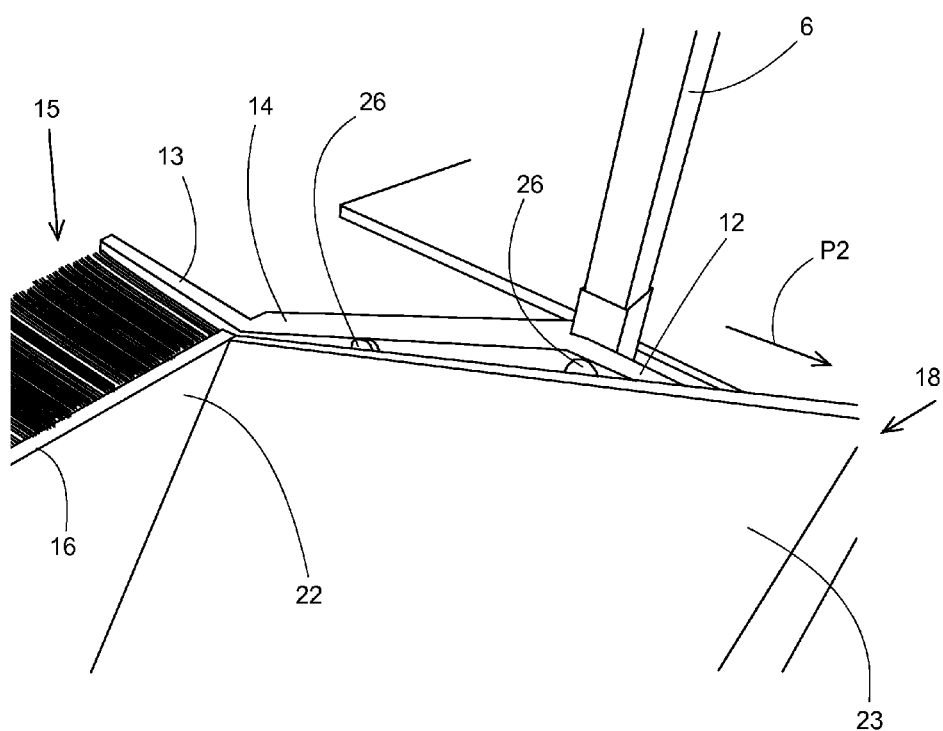
FIG. 5 is a view corresponding to FIG. 4 during movement away from each other of the fruit guiding means, each with the adjoining fruit collecting device.

To harvest fruit hanging from plants such as fruit trees, the fruit guiding means 15 are first moved away from each other in the direction indicated by arrow P2 (see FIG. 5), during which movement the guide wheels 26 are successively located in the second, third and first parts 13, 14, 12. The device 1 is then driven in, inter alia, the direction of movement indicated by arrow P1. The device may be pushed ahead manually or be provided with a drive unit. The device 1 is quite suitable for manual operation. The device 1 is driven to a plant in such a manner that a fruit guiding means 15 will be located on either side of the stem of the plant. The distance between the two second longitudinal sides 17 is such that the ends 27 of the wirelike, flexible elements 19 do not touch each other or the stem. The height of the frame 2 is such that the girders 5 do not touch the top of the plant.

The fruit guiding means 15, each with the adjoining fruit collecting device 18, are then moved toward each other, thereby placing the ends 27 of the wirelike, flexible elements 19 into abutment with the stem and with each other and between each other (see FIG. 2). During said movement, the wirelike, flexible elements 19 are elastically deformed. The stem is fully enclosed by the wirelike, flexible elements 19. A user can now start shaking the plant. Preferably, a manually operable plant shaking device, for example as known from EP 1 369 022 A1, is used for this purpose. On both sides of the device 1 a user can stand, so that a plant shaking device can be used from two sides simultaneously and a full container 10 can be exchanged for an empty container 10. As a result of said shaking, the fruit will be dislodged from the plant. The fruit will fall from the plant on the wirelike, flexible elements 19 or directly on the fruit collecting devices 18. When it falls on the wirelike, flexible elements 19, the fruit will slide in the direction of the fruit collecting device 18 under the influence of the force of gravity as a result of the angle which the wirelike, flexible elements 19 include with the horizontal, and fall into the container 10 that stands ready thereunder via the fruit outlet opening 21.

The device 1 is in particular suitable for use with relatively young plants whose stem is not very strong yet, but it can also be used with fully grown plants, of course.

LIST OF REFERENCE NUMERALS

1. Device
2. Frame
3. Bridge part
4. Leg parts
5. Girder
6. Upright
7. Girder
8. Wheel
9. Container support
10. Container
11. Guide
12. First part
13. Second part
14. Third part
15. Fruit guiding means
16. First longitudinal side
17. Second longitudinal side
18. Fruit collecting device
19. Flexible element
20. Horizontal
21. Fruit outlet opening
22. Downwardly sloping surface
23. Upwardly sloping auxiliary surface
24. Upwardly sloping auxiliary surface
25. Upwardly sloping auxiliary surface
26. Guide wheel
27. End
28. Container inlet opening

The invention claimed is:

1. A device suitable for harvesting fruit hanging from a plant, which device at least comprises a mobile frame, which frame at least comprises two opposite, elongated fruit guiding means, wherein first longitudinal sides of the fruit guiding means are positioned lower than opposite second longitudinal sides of the fruit guiding means, which frame further comprises fruit collecting devices adjoining the first longitudinal sides of the fruit guiding means, wherein both fruit guiding means are provided with wirelike, flexible elements made of plastic material extending from the first longitudinal sides, over which elements the fruit can be guided, which wirelike, flexible elements have a diameter in the order of 0.3 to 2 millimeter are arranged in a number of layers lying on top of each other, wherein the number of layers of wirelike, flexible elements lying on top of each other ranges between 5 and 20, wherein ends of the wirelike, flexible elements remote from the first longitudinal sides of the two fruit guiding means abut against a stem of a plant from either side and abut with each other.

2. A device according to claim 1, wherein the wirelike, flexible elements have a length in the order of 150 to 300 millimeter.

3. A device according to claim 1, wherein the wirelike, flexible elements include an angle in the order of 30 to 60 degrees-with the horizontal.

4. A device according to claim 1, wherein the fruit guiding means, each with its adjoining fruit collecting device, can be moved away from and toward each other in a direction transversely to the longitudinal sides via guide wheels.

5. A device according to claim 4, wherein the frame is further provided with guides for the fruit collecting device on either side of each fruit collecting device, which guides extend transversely to the longitudinal sides, wherein each guide has a first, raised part, a second, lowered part and a third part which slopes down between the first part and the second part.

6. A device according to claim 1, wherein the frame is movable via guide wheels at least in a direction of movement extending parallel to the longitudinal sides of the fruit guiding means.

7. A device according to claim 1, wherein the fruit collecting device at least comprises a surface that slopes down from the first longitudinal side, a fruit outlet opening located on a side of the downwardly sloping surface remote from the first longitudinal side, and a removable container that can be positioned under the fruit outlet opening.

8. A device according to claim 7, wherein the fruit outlet opening of the fruit collecting device is rectangular in shape, the fruit outlet opening being bounded on a first side by the surface that slopes down from the first longitudinal side and, on at least one second side, by an auxiliary surface that slopes up from the fruit outlet opening.

9. A device according to claim 1, characterised in that the fruit collecting device is provided with a container inlet opening on a side remote from the first side.

10. A device according to claim 1, wherein the frame is provided with container supports located on either side of the fruit guiding means.

11. A device according to claim 1, wherein the device is provided with a manually operable plant shaking device.

12. A method for harvesting fruit hanging from a plant, using a device, which device at least comprises a mobile frame, which frame at least comprises two opposite, elongated fruit guiding means, wherein first longitudinal sides of the fruit guiding means are positioned lower than opposite second longitudinal sides of the fruit guiding means, which frame further comprises fruit collecting devices adjoining the first longitudinal sides of the fruit guiding means,
moving the frame toward the plant for harvesting, until the fruit guiding means are positioned on either side of the plant, wherein each fruit guiding means is provided with wirelike, flexible elements made of plastic material extending from the first longitudinal side, which wirelike, flexible elements have a diameter in the order of 0.3 to 2 millimeter are arranged in a number of layers lying on top of each other, wherein the number of layers of wirelike, flexible elements lying on top of each other ranges between 5 and 20, wherein ends of the wirelike, flexible elements remote from the first longitudinal sides of the two fruit guiding means abut against a stem of a plant from either side and abut with each other abutting the elements against a stem of the plant, and shaking the plant until the fruit is dislodged, which fruit will slide over the wirelike, flexible elements to the fruit collecting device.

13. A method according to claim 12, wherein the fruit guiding means, each with the adjoining fruit collecting device, are moved away from each other before the device is moved to a plant.

14. A method according to claim 12, wherein the fruit is dislodged from the plant by means of a manually operable plant shaking device.

* * * * *